May 16, 1939.  G. M. BOOTH  2,158,976
GAS SUPPLY APPARATUS
Filed Aug. 15, 1936  2 Sheets-Sheet 1
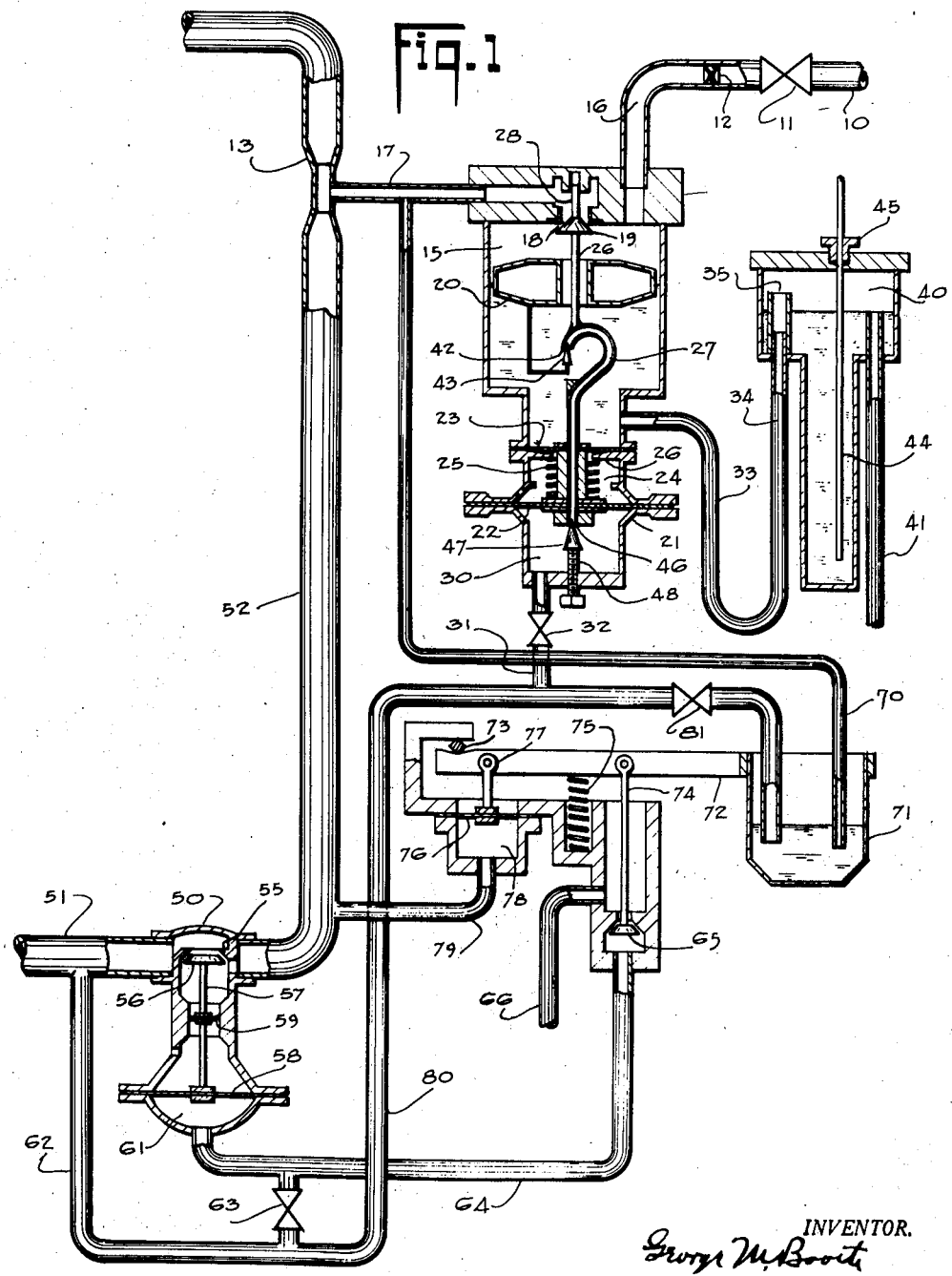

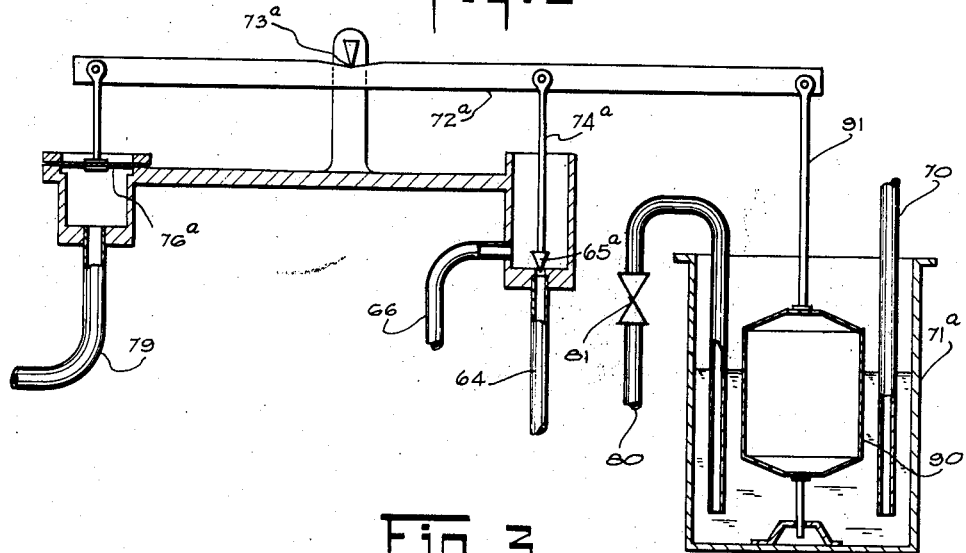
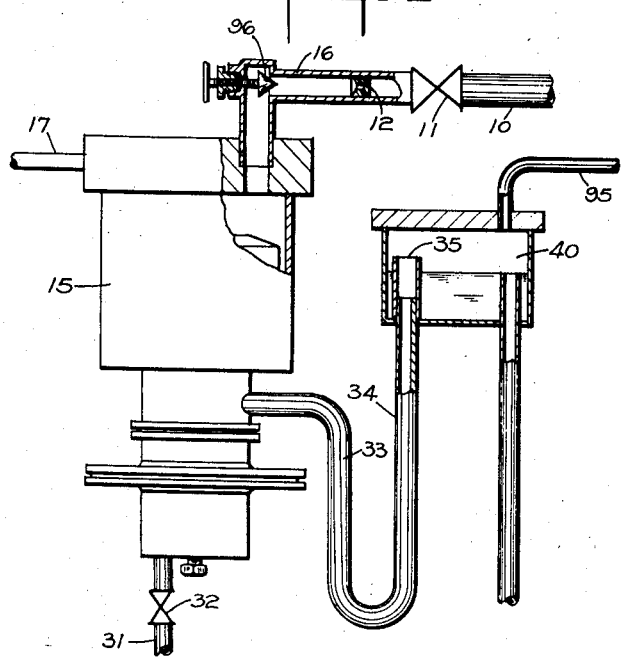

Patented May 16, 1939

2,158,976

UNITED STATES PATENT OFFICE 2,158,976

GAS SUPPLY APPARATUS

George M. Booth, Westfield, N. J., assignor to Wallace & Tiernan Company, Inc., Belleville, N. J., a corporation of New York Application August 15, 1936, Serial No. 96,242

13 Claims. (Cl. 210—28)

This invention relates to apparatus for moving gases by means of a controlled partial vacuum, or negative pressure, and more particularly to means for controlling the negative pressure produced by a Venturi aspirator applied to a flow-controlling orifice or other flow-resisting passage for drawing gas therethrough. The invention aims to obtain a more accurate control of the rate of flow of the gas in such an apparatus than has heretofore been found possible, especially at comparatively high rates of flow, and to accomplish this by controlling the flow-determining negative pressure by means which makes it possible to maintain a very constant and readily adjustable negative pressure, and to avoid certain disadvantages inherent in suction-controlling means heretofore used for the purpose of drawing gas at a controlled rate through a flow-controlling orifice.

The invention has been made especially with the idea of providing an improved apparatus for introducing gaseous chlorine at a controlled rate into a minor stream of water to produce a solution to be used for the treatment of water or sewage or for other purposes. In such apparatus in which chlorine gas supplied at a constant substantially atmospheric pressure is drawn through a flow-controlling orifice by a water aspirator, it has been the practice to have the pulling capacity of the aspirator somewhat greater than sufficient to draw gas at the maximum desired rate through the control orifice and to have the excess capacity of the aspirator satisfied by make-up water supplied to the suction inlet of the aspirator under a negative head which determines the partial vacuum or negative pressure available for sucking the gas. In some cases the negative head under which the make-up water is supplied to the aspirator is constant and the suction transmitted to the control orifice is determined by an adjustable restriction between the orifice and the aspirator. In other cases the flow rate of the gas is varied by varying the negative head against which the make-up water is supplied to the aspirator, this variation in such negative head being effected either at will or automatically proportionately to variations in quantity of flowing water to be treated.

In an apparatus embodying all the features of the present invention there is provided automatic means for controlling the pulling capacity of the aspirator and maintaining such capacity only slightly in excess of that required for sucking in the gas at the desired rate, and a power-operated adjustable restriction or valve automatically controlled by a negative hydraulic head for determining the suction head transmitted to the flow-controlling orifice or other flow-resisting means through which the gas is sucked from a constant pressure supply, thereby controlling the flow rate of the gas, and means for varying the flow rate of the gas by varying the restriction-controlling negative head. The desired negative pressure on the down stream side of the flow-controlling orifice is accurately maintained by the power operated adjustable restriction, and the pulling capacity of the aspirator is varied and adjusted according to and approximately in proportion to the amount of gas being drawn through the orifice so that the pulling capacity of the aspirator is at all times only slightly in excess of that required.

Doing away with the necessity of operating the aspirator at a pulling capacity greater than sufficient to draw the gas at a maximum desired rate and of supplying make-up water to reduce the suction of the aspirator has the advantages of reducing the cost of operation by reducing the amount of water used, and of avoiding the dilution by the make-up water of the solution produced by drawing the gas into the liquid passing through the aspirator. By means of the power-operated restriction or valve between the aspirator and the flow-controlling orifice, a very accurate control of the negative pressure transmitted to the orifice is secured, especially when the pulling capacity of the aspirator is regulated according to the rate at which the gas is being drawn so as to be at all times only slightly greater than required. The pulling capacity of the aspirator is controlled most desirably by regulating the operating pressure of the water supplied to the aspirator by means of a valve in the supply line. By automatically controlling the capacity of the aspirator in this way, it may be operated by the minimum amount of water required to maintain the desired negative pressure in the gas passage between the aspirator and the adjustable restriction. This, in addition to its economy in use of water, also permits the production of a solution of the gas of greater strength than would otherwise be possible. Other objects and features of the invention will appear from the following description.

A full understanding of the invention can best be given by a detailed description of a chlorine supply apparatus embodying the various features of the invention in the form now considered best, and such a description will now be given in connection with the accompanying drawings illustrating such an apparatus.

In said drawings:

Fig. 1 is a diagrammatic sectional view of the apparatus;

Fig. 2 is a similar view of an alternative form of a part of the complete apparatus; and Fig. 3 shows partly in elevation and partly in section an alternative form of another part of the apparatus.

Referring to the drawings, and first to Fig. 1, chlorine gas from a suitable source under pressure, such as a tank of compressed liquified chlorine, is supplied through a tube 10 to a pressure reducing valve 11 by which the gas is supplied at a constant substantially atmospheric pressure to a flow-controlling orifice 12. The gas is drawn through the flow-controlling orifice by the suction of a water aspirator 13. A float chamber 15 is connected between the orifice 12 and the aspirator by passage 16 from the orifice to the float chamber and passage 17 from the float chamber to the aspirator, and the outlet 18 from the float chamber to the passage 17 is restricted by a float-controlled valve 19. In operation the aspirator maintains a partial vacuum or negative pressure in the passage 17 which exceeds the negative pressure desired on the down stream side of the orifice 12, and the exact negative pressure transmitted to the orifice is determined by the restriction at the valve 19.

The valve 19 is automatically controlled to maintain the desired negative pressure in the passage 16, and, therefore, the desired pressure drop across the orifice, and the operation of the valve controlling means is adjustably variable for changing the negative pressure transmitted to the orifice to change the drop in pressure across the orifice and thereby the rate of flow of the gas; and the operation of the aspirator is automatically controlled to limit its pulling capacity to that which is only slightly greater than is necessary to draw the gas through the orifice at the desired rate by maintaining the desired negative pressure in the passage 17.

*The controlled automatically operating negative pressure controlling valve*

Water is raised in the chamber 15 against a negative head by reason of the negative pressure therein, and the valve 19, the position of which determines the negative pressure maintained in the chamber and transmitted to the orifice 12, is controlled by a float 20 in the chamber, the control being such that when by rise in the water level in the chamber the float is raised above a predetermined position the valve will be given a closing movement to increase the resistance to outflow from the chamber and thereby reduce the vacuum within the chamber and the passage 16, and that when by fall of the water level in the chamber the float moves downward, the valve will be opened to reduce the flow resistance through the outlet, thereby increasing the vacuum in the chamber and in the passage 16. The negative head against which the water is raised by the negative pressure in the chamber thus determines the degree of vacuum or negative pressure maintained within the chamber and, therefore, the drop in pressure across the orifice.

In order to obtain great accuracy in maintenance of the desired pressure reduction in the chamber 15 and passage 16, means are provided for power operation of the valve 19 under control of the float 20 instead of having the valve operated directly by the float.

Extending downward from the casing of the chamber 15 is a diaphragm casing 21 in which is mounted an operating diaphragm 22, and above and spaced from this diaphragm there is a sealing diaphragm 23 which forms a sealing partition at the bottom of the float chamber and between the float chamber and the space or chamber 24 between the two diaphragms. There is a spring 25 in the chamber 24 the upper end of which bears against a flange 26 extending inwardly from the casing wall and the lower end of which bears against the diaphragm 22 and tends constantly to force the diaphragm downward. The valve 19 is connected to diaphragm 22 by a rod 26 and tube 27, the rod 26 extending freely through a central opening in the float 20, and the tube 27 extending through and having a watertight connection with the diaphragm 23 and having its lower end extended through and secured watertight to the diaphragm 22. A guide stem 28 extends upward from the valve 19 into a suitable guide recess in a part which forms the top wall of the float chamber.

The space 30 within the diaphragm casing beneath the diaphragm serves as a pressure chamber, and in the operation of the apparatus this pressure chamber is supplied with a constant small flow of water through a tube 31 from a source of supply under suitable pressure, the supply to the chamber being controlled by a constant flow rate valve 32 which operates to maintain the flow of water into the chamber constant regardless of the pressure within the chamber or the pressure in the tube 31 within the operating limits. When the water is permitted to flow freely from the chamber 30, no pressure is developed against the under side of the diaphragm, and the diaphragm is forced downward by the spring 25. The outflow of water from the chamber 30 is through the tube 27, the water being discharged into the float chamber 15. From the chamber 15 the water flows through a downwardly extending tube 33 which connects at its lower end to an upwardly extending overflow tube 34, the two together forming a U-tube. From the overflow outlet 35 at the top of the ube 34 the water falls into a chamber 40 from which it flows to waste through a tube 41.

The outflow of water from the pressure chamber 30 through the tube 27 is controlled according to the position of the float 20 by a float-controlled valve so that by upward movement of the float the valve is given a closing movement and by downward movement of the float the valve is given an opening movement. Most desirably, and as shown, the tube 27 has at its upper end a downwardly opening valve seat 42 to cooperate with a valve 43 carried directly by the float.

The water level within the float chamber 15 is determined by the degree of vacuum or negative pressure within the chamber and the negative head against which water is raised in the chamber. As the water level within the chamber 15 determines the position of the float and the float controls the valve 19, which controls the negative pressure maintained in the chamber, this negative pressure is determined by the negative head against which the water is raised in the chamber and may be varied by varying this negative head. This negative head depends on the elevation of the overflow outlet 35 and the air pressure at the outlet. Instead of varying this negative head by varying the elevation of the overflow outlet as in the apparatus of the Peet application referred to, the overflow outlet 35 is, in the construction illustrated, fixed, and the chamber 40 into which the outlet discharges is a closed chamber, and the desired negative head is obtained by establishing a suitable negative pressure in this chamber and desired variation in the head is effected by changing the pressure in this chamber. As shown, the overflow outlet 35 is positioned at approximately the normal operating level of the water within the chamber 15. With the overflow outlet so located the same degree of vacuum will be maintained in the chamber 15 and tube 16 as is established in the chamber 40.

Any suitable means may be provided for producing the desired degree of vacuum in the chamber 40 and for varying the degree of vacuum either automatically or at will. In the means shown for this purpose, and which forms a feature of the invention, the tube 41 through which the water overflowing from the outlet 35 is discharged from the chamber 40 is a vertical tube large enough so that the amount of water passed by the valve 32 and overflowing from the outlet 35 will not cause the tube to run entirely full and yet small enough so that the tube will be sealed and that air will be carried down with the water. Air is thus exhausted from the chamber 40 and a partial vacuum produced in the chamber; and the exact degree of vacuum obtained in the chamber is determined by the depth of submergence in the water standing in the chamber 40 of the discharge end of an air inlet tube 44. Air from the tube 44 bubbles up through the water and is carried out through the vacuum-creating discharge tube 41. The depth of submergence of the discharge end of the tube 44 will be the measure of the degree of vacuum maintained in the chamber 40, and the degree of this vacuum may be varied by varying the depth of submergence of the discharge end of the tube. To provide for such adjustment, the tube 44 is mounted to extend vertically and to be slidably adjustable through a stuffing box 45 in the top or cover wall of the chamber 40. The drop of the tube 41 should be sufficient to produce a degree of vacuum in the chamber 40 in excess of any required in the operation of the apparatus.

When no water is flowing to the pressure chamber 30, the spring 25 forces the diaphragm 22 down until the lower end 46 of tube 27 seats on a valve head 47 carried by a screw-adjustable stem 48. Downward movement of the diaphragm is thus limited, and the valve closes the tube 27 against back flow from the chamber 15 into the water supply. When the pressure water is admitted to the chamber 30, pressure against the under side of the diaphragm 22 overcomes the downward force of spring 25 and the diaphragm is caused to rise sufficiently to relieve up through the tube 27 the quantity of water passed by valve 32.

In the operation of the apparatus as so far described, gas being supplied to the control orifice 12 at a constant substantially atmospheric pressure, and the aspirator 13 operating to maintain in the passage 17 a degree of vacuum, or negative pressure, in excess of that which is to be transmitted to the control orifice, the negative pressure in the chamber 15 and tube 16 and resulting pressure drop across orifice 12 is controlled by the valve 19. If the degree of vacuum in the chamber 15 and tube 16 is greater than it should be to produce the desired pressure drop across the orifice and the desired gas flow corresponding to the degree of vacuum in the chamber 40, the water level in the chamber 15 will rise and the float will give a closing movement to the valve 43 to throttle the outlet from the tube 27. This produces a pressure rise in the chamber 30 which causes the diaphragm 22 to move upward to give a slight closing movement to the valve 19, thus reducing the degree of vacuum in the chamber 15. The upward movement of the diaphragm also, however, carries the seat 42 at the end of the tube 27 slightly away from the valve 43, thereby limiting the increase in pressure in the chamber 30 and causing the diaphragm and parts moved by it, including the valve 19, to come to rest at a position determined by the float 20. If the degree of vacuum in the chamber 15 and tube 16 is less than it should be, then the water level in the chamber 15 falls and downward movement of the float moves the valve 43 away from its seat. Resistance to outflow of water from the chamber 30 through the tube 27 is thereby reduced, producing a drop in pressure in the chamber 30 which causes the diaphragm 22 to move downward to give a slight opening movement to the valve 19 which increases the degree of vacuum in chamber 15, and, also, to move the seat 42 toward the valve 43 to limit the decrease in pressure in chamber 30, thereby causing the diaphragm and parts carried by it, including the valve 19, to come to rest at a position determined by the float. The valve 19 will thus be automatically adjusted to maintain a degree of vacuum in the chamber 15 and tube 16 corresponding to the negative pressure in the air vacuum chamber 40; and with the parts arranged as shown, the negative pressure maintained in the chamber 15 will be the same as that in the chamber 40.

The water level in the chamber 15 stays substantially constant, rising and falling only slightly as valve 19 requires adjustment for maintaining the desired negative pressure in chamber 15. Since the valve-controlled outlet 18 from the chamber 15 is of relatively large diameter for the quantity of gas passed, only slight changes in the position of valve 19 are required to control properly over the range of negative pressures to be maintained in the chamber 15. The spring 25 has a low rate (a weight acting on the diaphragm 22 might be substituted) so that for causing the total required valve adjusting movement of the diaphragm 22 only a slight change in pressure in the chamber 30 is required. Only a slight change in the opening through seat 42 is required, therefore, for effecting the slight change required in resistance to the outflow of the water supplied at a constant rate to the chamber 30. There is thus a substantially fixed relation between the float 20 and the vacuum control valve 19, only small movements of the float being required to cause the small controlling movements of the valve.

The gas forces acting on the valve 19 are negligibly small compared to the positioning forces acting on the diaphragm 22, and the float is without mechanical connection to either the valve or the diaphragm. The only reaction tending to change the submergence of the float is the downward force of the water from the seat 42 on the valve 43, and this reaction is small and varies only very slightly since the pressure in the tube 27 varies only very slightly. It is apparent, therefore, that the valve 19 follows in its movements very closely any changes in the water level in the chamber 15, with the result that the apparatus operates with a high degree of accuracy in maintaining the desired degree of vacuum in the chamber 15 and tube 16 according to the degree of vacuum in the air vacuum chamber 40.

If the gas is supplied to the control orifice 12 at just atmospheric pressure and the overflow outlet 35 is positioned at the operating level of the water within the chamber 15, the drop in pressure across the orifice 12 will equal the degree of vacuum maintained in chamber 40, and the depth of submergence of the end of the air tube 44 in inches will be the measure of the drop in pressure across the orifice as expressed in inches of water. If the gas is supplied to the inlet side of the orifice at a pressure slightly below atmospheric pressure, then in order to obtain a given pressure drop across the orifice, the degree of vacuum maintained in the chamber 40 should be increased by an amount equal to the negative pressure under which the gas is supplied to the orifice, or the overflow outlet 35 should be lowered a corresponding number of inches, and if the gas is supplied to the orifice at a pressure slightly above atmosphere, then for obtaining the given pressure drop across the orifice the degree of vacuum maintained in the chamber 40 should be reduced or the overflow outlet 35 raised correspondingly.

*The means for controlling the pulling capacity of the aspirator*

The gas pulling capacity of an aspirator of a given size depends on the pressure under which the operating fluid enters the aspirator and the back pressure against which the aspirator discharges. Most desirably, as stated, the pulling capacity of the water aspirator of the apparatus of the present invention is controlled by regulating the pressure under which the water is supplied to the aspirator, and according to the invention, the water pressure is automatically so regulated or controlled that the pulling capacity of the aspirator is at all times only slightly in excess of that required to suck in the gas at the desired rate, whatever that rate may at the time be within the operating range of the apparatus. This control is by means of a valve 50 to which water is supplied through a pipe 51 at suitable pressure not less than the maximum pressure needed for operating the aspirator 13 and from which the water is supplied to the aspirator through a pipe 52 at a pressure determined by the valve.

The valve 50 comprises a seat 55 and a valve disc 56 carried by a stem 57 which extends to a diaphragm 58 in a diaphragm casing connected to the valve casing by a neck having a cylindrical bore in which slides a piston 59 fixed on the stem 57. The piston 59 partitions the valve chamber from the space above the diaphragm, protecting the diaphragm from the pressure within the valve chamber, and is of about the same area as the valve disc so that any water pressure on the under side of the valve disc tending to move the disc toward its seat is substantially balanced by the pressure on the upper side of the piston. The space within the diaphragm casing between the diaphragm and the piston is open to atmosphere as the drawings show. Therefore, regardless of its position, the opening pressure on the valve disc is approximately proportional to the pressure in the pipe 51 at the inlet side of the valve.

Water from a suitable source under pressure, such as the pipe 51 as shown, is supplied to the chamber 61 at the under or outer side of the diaphragm through a tube 62, valve 63 and tube 64. The valve 63 provides a restriction permitting only a very small flow of water into the tube 64, and is most desirably a constant flow rate valve similar to valve 32. If the water is permitted to escape freely from the chamber 61 or from the tube 64 no pressure will build up in the chamber 61, but if the outflow of water from the chamber or pipe 64 is restricted, pressure will build up in the chamber and tube to a degree dependent on the resistance to the outflow. A valve 65 controls the outflow from the tube 64 and therefore controls the pressure on the diaphragm 58 tending to move the diaphragm to close the valve 50. Water passing the valve 65 goes to waste through tube 66.

Valve 65 is controlled according to the suction exerted by the aspirator. To obtain this control a small tube extends upward to the suction passage 17 from a container to which water is constantly supplied at a very low rate, and the valve 65 is operated by means responding to variations in the amount of water in such container. In the apparatus as shown in Fig. 1, a tube 70, which is most desirably of small bore, extends upward to the passage 17 between the chamber 15 and the aspirator from a container 71 which is hung on a lever 72 fulcrumed at 73 and to which lever the valve 65 is connected by means of a rod 74. A spring 75 presses upward on the lever with sufficient force to support the lever in position to close the valve 65 when the container 71 is empty, and additional upward pressure on the lever at a point between its fulcrum and the container 71 is provided by a diaphragm 76 connected to the lever by rod 77 and forming one side of a chamber 78 which is connected by a tube 79 to the pipe 52. The operating pressure of the water flowing to the aspirator through pipe 52 thus reacts through the diaphragm 76 on the lever against the downward force of the weight of the water which may at any time be in the container 71. A constant small flow of water is supplied to the container 71 through a tube 80 supplied from the tube 62, the flow into the container being controlled by a constant flow rate valve 81 which operates to maintain the rate of supply of water to the container constant regardless of variations in pressure in the tube 62 or other source from which the water is supplied.

If the lever 72 is moved downward to open the valve 65 so that the water entering through the valve 63 is freely relieved from tube 64 and no pressure is built up in the diaphragm chamber 61, the inlet water pressure in pipe 51 forces valve disc 56 to its wide open position, permitting maximum pressure to operate the aspirator. If, on the other hand, by upward movement of the lever 72 the valve 65 is closed, the pressure rises in the diaphragm chamber and the valve 50 is closed and the supply of water to the aspirator is entirely cut off. In normal operation of the apparatus, valves 65 and 56 are both partly open, the pressure under which the aspirator is being operated being transmitted through the tube 79 to diaphragm 76 to balance the downward force of the weight of water in container 71 to hold the lever 72 in an intermediate position, and water flowing constantly into the container 71 at a low rate and being drawn from the container through the tube 70 into the passage 17 and thence into the throat of the aspirator together with gas from the chamber 15.

If the small quantity of water entering the container is in excess of the quantity withdrawn through the tube 70, the weight of water in the container will increase. This increased weight in the container will move the lever 72 downward, thereby opening the valve 65 and reducing the resistance to outflow of water from tube 64, to lower the pressure on the diaphragm 58 and permit a decrease in the quantity of water in the chamber 61. This causes an opening movement of the valve disc 56 with a resulting increase in the aspirator operating pressure in the pipe 52, and the increased pressure in pipe 52 transmitted through tube 79 to diaphragm 76 tends to balance the increased weight of water in the container. The increase in weight of water in the container and the resulting increased pressure in the pipe 52 will continue until the pulling capacity of the aspirator has been increased to maintain a degree of vacuum, or negative pressure, in the passage 17 sufficient to withdraw through tube 70 a quantity of water equal to that entering the container through valve 81. This negative pressure will be that desired to be maintained in the passage 17 as determined by the negative head in tube 70.

If, on the other hand, the aspirator is operating with a pulling capacity sufficient to withdraw water from the container 71 faster than it enters the container, the weight of water in the container will decrease and the lever 72 will rise, thereby throttling the valve 65, causing pressure on the diaphragm 58 to be increased and the valve 50 to be throttled. The aspirator operating pressure will thereby be reduced, and this will be accompanied by a reduced thrust by the diaphragm 76 on the lever, and the lever will again become balanced when the operating pressure on the aspirator has been decreased to a point where its pulling capacity is just sufficient to withdraw water from the container at the same rate that water enters the container, the negative pressure in the passage 17 then being the desired negative pressure determined by the negative head in tube 70.

The pulling capacity of the aspirator will thus be automatically adjusted to be at all times only slightly in excess of that required to maintain a predetermined negative pressure in the passage 17 for drawing the gas at a rate determined by the adjustment of the valve 19, and this automatic adjustment of the pulling capacity of the aspirator will follow either a change in adjustment of the valve 19 or a change in the pressure under which water is supplied through the pipe 51. The aspirator will thus be operated at all times with only a trifle more than the minimum amount of water required to develop a pulling capacity sufficient to suck in the gas at the desired rate, and all necessity of operating the aspirator at the maximum capacity which may be required and then satisfying the excess over the capacity required at any time by supplying make-up water to the aspirator is avoided. Water drawn up through the tube 70 is not make-up water, that is, water to satisfy the excess capacity of the aspirator. This tube is a control tube serving to provide a negative hydraulic head which determines the negative pressure maintained in the passage leading to the aspirator throat by controlling according to the rate at which water is drawn through this tube a valve which controls the operating pressure on the aspirator and thereby its pulling capacity.

In Fig. 2 there is shown means for controlling the pressure on the valve-controlling diaphragm 58 in which, instead of having the container 71 carried by a lever which is positioned according to the weight of water in the container and which positions the valve controlling the outlet from the tube 64, the container is stationary and a float serves to position the valve-positioning lever according to the water level in the container. As shown in Fig. 2, the small flow of water through the tube 80 controlled by the valve 81 is discharged into a stationary container 71a from which water is drawn through the tube 70. A float 90 in this container is hung by a rod 91 from one end of a lever 72a fulcrumed at 73a and connected at its other end to receive the thrust of a diaphragm 76a which receives the pressure of water from the tube 79 and exerts a force on the lever in opposition to the lift of the float. A valve 65a connected to the lever by a rod 74a controls the outlet from tube 64 and is so arranged that when by increase of water in the container the float rises, the lever gives an opening movement of the valve 65a, and when the amount of water in the container is reduced and the float falls, a closing movement is given to the valve. This modified means for controlling the pressure on the diaphragm 58 cooperates with the apparatus as a whole in the manner described in connection with Fig. 1.

Instead of producing a partial vacuum in the vacuum chamber 40 by means of the overflow tube 41 and determining the exact degree of vacuum in the chamber by the depth of submergence of the discharge end of the air inlet tube 44, the degree of vacuum in the chamber may be determined and controlled by transmitting the desired degree of vacuum to the chamber through a connecting tube 95, as shown in Fig. 3. In this way the vacuum maintained in the chamber 40 may readily be varied to vary the negative head against which the water is raised in the float chamber 15, and thereby the flow rate of the chlorine, proportionately to variations in the quantity of flowing water being treated by the discharge from the aspirator 13, as by connecting the tube 95 to a differential converter as in the apparatus of the Wallace Patent No. 1,777,987. When the rate of supply of chlorine is so varied according to variations in flow rate of water to which the chlorine is supplied, the dosage may be adjusted by means of a valve in the connecting passage between the flow-controlling orifice and the float chamber, as shown at 96 in Fig. 3.

What is claimed is:
1. The combination with flow-controlling means and means for supplying gas at a controlled pressure to the flow-controlling means and a suction device for drawing the gas through the flow-controlling means, of means providing a restriction in the flow passage between the flow-controlling means and the suction device adjustable for determining the negative pressure transmitted to the flow-controlling means, and automatically acting means for controlling the operation of the suction device to vary its pulling capacity to maintain for different adjustments of said restriction a desired negative pressure between the suction device and said restriction.

2. The combination with flow-controlling means and means for supplying gas at a controlled pressure to the flow-controlling means and a suction device for drawing the gas through the flow-controlling means, of means providing a restriction in the flow passage between the flow-controlling means and the suction device adjustable for determining the negative pressure transmitted to the flow-controlling means, and means responsive to the negative pressure between the suction device and said restriction for controlling the operation of the suction device to vary its pulling capacity to maintain said negative pressure substantially constant for different adjustments of said restriction.

3. The combination with flow-controlling means and means for supplying gas at a constant substantially atmospheric pressure to the flow-controlling means and a suction device for drawing the gas through the flow-controlling means, of means providing an adjustable restriction in the flow passage between the flow-controlling means and the suction device, means responsive to the negative pressure between the flow-controlling means and said restriction and to a control factor for adjusting said restriction to maintain a desired pressure drop across the flow-controlling means, means for varying said control factor to vary the maintained pressure drop across the flow-controlling means, and means responsive to the negative pressure between the suction device and said restriction for controlling the operation of the suction device to vary its pulling capacity to limit the degree of said negative pressure.

4. The combination with flow-controlling means and means for supplying gas at a constant substantially atmospheric pressure to the flow-controlling means and a suction device for drawing the gas through the flow-controlling means, of means providing an adjustable restriction in the flow passage between the flow-controlling means and the suction device, means responsive to variations in the negative pressure between the flow-controlling means and said restriction for adjusting said restriction to maintain a desired drop in pressure across the flow-controlling means, means adjustable for varying the drop in pressure across the flow-controlling means maintained by said pressure responsive means, and means responsive to the negative pressure between the suction device and said restriction for controlling the operation of the suction device to vary its pulling capacity to limit the degree of said negative pressure.

5. The combination with flow-controlling means and means for supplying gas at a constant substantially atmospheric pressure to the flow-controlling means and a suction device connected to draw the gas through the flow-controlling means, of means providing an adjustable restriction in the connecting passage between the suction device and the flow-controlling means, motor means for adjusting said restriction, and means responsive to variations in the negative pressure between said restriction and the flow-controlling means for controlling the operation of said motor means to maintain said negative pressure constant.

6. The combination with flow-controlling means and means for supplying gas at a constant substantially atmospheric pressure to the flow controlling means and a suction device for drawing the gas through the flow-controlling means, of a float chamber connected between the flow-controlling means and the suction device, means providing an adjustable restriction for controlling the flow of gas from said chamber, motor means for adjusting said restriction, means for maintaining water in said chamber under a negative head, and a float in said chamber for controlling the operation of said motor means according to the negative pressure and resulting water level in said chamber to close the restriction when the water rises above a predetermined level and to open the restriction when the water falls below said predetermined level.

7. The combination with flow-controlling means and means for supplying gas at a constant substantially atmospheric pressure to the flow-controlling means and a suction device for drawing the gas through the flow-controlling means, of a float chamber connected between the flow-controlling means and the suction device, means providing an adjustable restriction for controlling the flow of gas from said chamber, a control member for adjusting said restriction, means tending to move said member in one direction to open the restriction, means for supplying liquid pressure to move said member in the other direction to close the restriction, means for maintaining water in said chamber under a negative head, a float in the chamber, and means operated by said float for controlling said liquid pressure.

8. The combination with flow-controlling means and means for supplying gas at a constant substantially atmospheric pressure to the flow-controlling means and a suction device connected to draw the gas through the flow-controlling means, of a float chamber connected between the flow-controlling means and the suction device, a valve for controlling the flow of gas from said chamber, an operating member connected to said valve, means tending to move said member in the direction to open the valve, a pressure chamber a part of the wall of which is formed by said operating member and pressure in which tends to move the operating member in the direction to close the valve, means for supplying water to said pressure chamber at a constant flow rate, an outlet passage from the pressure chamber discharging into the float chamber, means for maintaining a negative head on the water in the float chamber comprising an overflow tube the lower end of which is connected to the lower part of the float chamber to form a U-tube and means for maintaining a negative pressure on the overflow end of the overflow tube, means for varying said negative pressure to vary said negative head, a float in the float chamber, and a valve for controlling said outlet passage controlled by said float.

9. The combination with a suction device and means providing a gas passage leading to the suction device, of means providing an adjustable restriction in said passage, means for automatically adjusting said restriction to maintain a desired negative pressure in said passage, at the inlet-side of the restriction, means adjustable for varying the negative pressure maintained by said automatic means, and means for automatically controlling the suction device to vary its pulling capacity with variation in the rate of gas flow in said passage.

10. The combination with a water aspirator and means for supplying water under pressure for operating the aspirator and means providing a gas suction passage leading to the aspirator, of a valve for regulating the pressure of water supplied to the aspirator, a container, means for supplying a small continuous flow of water to the container, means providing a passage leading from the container upward to the suction passage, and means for controlling said valve according to the amount of water in the container.

11. The combination with a water aspirator and means for supplying water under pressure for operating the aspirator and means providing a gas passage leading to the aspirator, of a valve for regulating the operating pressure on the aspirator, a container, means for supplying a small continuous flow of water to the container, means providing a small passage from the container upward to the suction passage, a lever by which said container is carried, means for applying to the lever in opposition to the weight of the water in the container a force which varies with the operating pressure on the aspirator, a pressure chamber, means responsive to the pressure in said pressure chamber for adjusting said valve, means for supplying water at a constant flow rate to said pressure chamber, an outlet passage for said water, and a valve for controlling said outlet passage controlled by said lever.

12. The combination with a gas flow passage having a flow-controlling means therein and means for supplying gas at a controlled pressure to said flow-controlling means, of a suction device for drawing the gas through the flow-controlling means, and means responsive to variations in the negative pressure at the intake side of the suction device for controlling the operation of the suction device to vary its pulling capacity to maintain said negative pressure substantially constant for varying rates of gas flow.

13. The combination with flow-controlling means and means for supplying gas at a constant pressure to the flow-controlling means, of a suction device for drawing the gas through the flow-controlling means, means providing a restriction in the flow passage between the flow-controlling means and the suction device adjustable for determining the negative pressure transmitted to the flow-controlling means, and means responsive to variations in the negative pressure between the suction device and said restriction for controlling the operation of the suction device to vary its pulling capacity to maintain said negative pressure substantially constant.

GEORGE M. BOOTH.